United States Patent
Villari et al.

(10) Patent No.: US 7,340,869 B2
(45) Date of Patent: Mar. 11, 2008

(54) FIREPROOF GLAZING UNIT

(75) Inventors: Valentino Villari, Moenchengladbach (DE); Albert van Oijen, Afferden (NL)

(73) Assignee: Scheuten Glagroep BV, Venlo (NL)

( * ) Notice: Subject to any disclaimer, the term of this patent is extended or adjusted under 35 U.S.C. 154(b) by 0 days.

(21) Appl. No.: 10/527,385

(22) PCT Filed: Sep. 11, 2003

(86) PCT No.: PCT/EP03/10097

§ 371 (c)(1),
(2), (4) Date: Apr. 6, 2006

(87) PCT Pub. No.: WO2004/024441

PCT Pub. Date: Mar. 25, 2004

(65) Prior Publication Data

US 2007/0011988 A1    Jan. 18, 2007

(30) Foreign Application Priority Data

Sep. 13, 2002 (EP) ................... 02020632

(51) Int. Cl.
  *E04C 2/54* (2006.01)
  *E04C 2/00* (2006.01)
(52) U.S. Cl. ............ 52/786.11; 52/232; 52/786.1
(58) Field of Classification Search .......... 52/204.593, 52/786.1, 786.11, 786.13, 788.1, 232, 171.3, 52/171.1, 786.12, 787.11
See application file for complete search history.

(56) References Cited

U.S. PATENT DOCUMENTS

| | | | | |
|---|---|---|---|---|
| 3,597,050 A | | 8/1971 | Plumat | 350/276 |
| 3,974,316 A | * | 8/1976 | Jacquemin et al. | 428/215 |
| 4,190,698 A | * | 2/1980 | De Boel et al. | 428/334 |
| 5,496,640 A | * | 3/1996 | Bolton et al. | 428/421 |
| 5,794,403 A | * | 8/1998 | Oberlander et al. | 52/786.11 |
| 6,632,491 B1 | * | 10/2003 | Thomsen et al. | 428/34 |
| 7,083,857 B2 | * | 8/2006 | Sawada et al. | 428/432 |
| 2001/0007488 A1 | | 7/2001 | Sawada | |
| 2002/0045073 A1 | * | 4/2002 | Finley | 428/701 |
| 2003/0101664 A1 | * | 6/2003 | Trpkovski | 52/171.3 |
| 2006/0046073 A1 | * | 3/2006 | Neuman et al. | 428/432 |

FOREIGN PATENT DOCUMENTS

| | | |
|---|---|---|
| JP | 3-40944 | 2/1991 |
| WO | WO 99/35102 | 7/1999 |

OTHER PUBLICATIONS

"Titanium Dioxide—Titania" AZoM—Metals, Ceramics, Polymers, Composites, An Engineers Resource, CERAM Research Ltd., http://www.azom.com/details.asp?ArticleID=1179; Apr. 19, 2003.*

(Continued)

*Primary Examiner*—Richard E. Chilcot, Jr.
*Assistant Examiner*—Ryan D Kweicinski
(74) *Attorney, Agent, or Firm*—Marshall, Gerstein & Borun LLP

(57) ABSTRACT

The disclosure relates to a fireproof glazing unit including at least two spaced-apart transparent substrates, with a transparent fireproof layer disposed between the substrate. A transparent $TiO_2$ layer, which reduces the incidence of UV radiation onto the fireproof layer, is disposed on at least one side of the fireproof layer.

10 Claims, 2 Drawing Sheets

OTHER PUBLICATIONS

Hornbostel, Caleb. Construction Materials: Types, Uses, and Applications. Jan. 1991, Wiley-Interscience, 2nd Edition, pp. 883-884.*

CEFIC—European Chemical Undustry Council Dec. 29, 2004, http://webarchive.org/web/20041229061722/http://www.cefic.org/.*

International Search Report in PCT/EP03/10097 dated Jan. 12, 2004.

International Preliminary Examination Report in PCT/EP03/10097 dated Aug. 23, 2004.

* cited by examiner

FIREPROOF GLAZING UNIT

This is the U.S. national phase of International Application No. PCT/EP03/10097 filed Sep. 11, 2003, the entire disclosure of which is incorporated herein by reference.

BACKGROUND OF THE DISCLOSURE

1. Field of the Disclosure

The disclosure relates to a fireproof glazing unit including at least two transparent substrates spaced from each other, with at least one transparent fireproof layer between the substrates.

2. Related Technology

In order to configure transparent glazing units as fireproof glazing, it is a known to employ laminated glass that has at least one transparent fireproof layer. The effect of such a fireproof layer can be, for instance, that in case of fire, it expands to create a hardening foam that consequently forms a shield against the heat generated by the fire. However, most of the familiar fireproof systems have the drawback that the fireproof layers used are not UV-stable. As a consequence, exposure to sunlight over a prolonged period of time causes the fireproof layer to become cloudy, a phenomenon that greatly impairs the appearance of the glazing. This is particularly disadvantageous when fireproof glazing is used in residential, office or other public areas, where the visual appearance of glass panes is of great importance.

In order to reduce the UV sensitivity of fireproof layers, it is a known procedure to employ various additives in the production of the layers. For instance, DE 44 35 841 proposes the use of potash water glass as an additive for the fireproof layer between two glass panes. Here, the amount of the additive consisting of potash water glass is selected in such a way that, as a function of the prevailing conditions, a detrimental sensitivity to ultraviolet light no longer exists. The main components of the described fireproof layer are soda water glass and water, whereas organic additives in the form of polyvalent alcohols and/or sugars constitute minute residues.

The disadvantage of stabilized protective layers lies in the fact that the production of fireproof layers is always associated with a great deal of effort in view of the process involved. For example, the necessary potassium water glass component has to be precisely determined and adjusted to any changes in the composition of the layer. Moreover, the processes can only be employed for one type of fireproof layer, while other forms require adapted additives or even different solutions.

WO 99/35102 and corresponding JP 111 99 278 disclose a UV-absorbing fireproof glazing in which, in front of a fireproof layer that foams in case of fire, there is a UV-absorbing layer containing the amide compounds of an aminosilane compound that reacts with a UV-absorbing compound. Even though this method is suitable for different fireproof layers, it is very demanding.

GENERAL DESCRIPTION

Therefore, the disclosure provides fireproof glazing that is simple to produce and that has at least one transparent fireproof layer exhibiting a high level of UV stability.

Accordingly, the disclosure provides a fireproof glazing unit—including at least two transparent substrates disposed at a certain distance from each other, whereby there is at least one transparent fireproof layer between these substrates—is configured in such a way that there is a transparent $TiO_2$ layer that reduces the incidence of UV radiation onto the fireproof layer on at least one side of the fireproof layer.

In order to absorb the UV radiation of the incident sunlight and to reduce it for the fireproof layer that lies behind the $TiO_2$ layer, the $TiO_2$ layer is advantageously located on the side of the fireproof layer that faces outwardly.

It has proven to be advantageous to configure the fireproof glazing unit in such a manner that the fireproof layer displays an absorption of at least 70% within the wavelength spectrum from 800 nm to 1400 nm. This prevents heat from penetrating the spaces that are to be protected.

It is also advantageous to configure the fireproof glazing unit in such a way that the $TiO_2$ layer displays an absorption between 3% and 15% within the wavelength spectrum from 320 nm to 480 nm. In this manner, damage to the fireproof layer by UV radiation can be largely prevented.

In order to further increase the stability of the fireproof layer contained in the fireproof glazing unit, it is practical to configure the $TiO_2$ layer in such a way that it exhibits a reflection of at least 40% within the wavelength spectrum from 320 nm to 480 nm.

An especially preferred embodiment of the fireproof glazing unit is characterized in that the $TiO_2$ layer displays a reflection of 40% to 60% within the wavelength spectrum from 320 nm to 480 nm.

In an advantageous embodiment, the UV-absorbing $TiO_2$ layer is located on the surface of a glass pane of the glazing unit facing outwardly. In another particularly preferred embodiment, the UV-absorbing $TiO_2$ layer is located between the inner surface of the outwardly-facing glass pane and the fireproof layer. In addition to glass panes spaced at a certain distance from each other and the fireproof layer, the fireproof glazing unit can include other functional layers. Examples of these are fluorine-doped $SnO_2$ layers for IR reflection. In the case of several functional layers between the outer glass pane and the fireproof layer, the $TiO_2$ layer can also be disposed between the various layers. The arrangement of the layer is preferably selected in such a manner that the function of the surrounding layers is not impaired by the reduction of the incident UV radiation.

Layers containing $TiO_2$ components are normally employed to create an auto-catalytic effect on surfaces. This effect serves to protect the surface against the effects of weather and dirt. The UV-absorbing properties of $TiO_2$, however, give rise to surprising advantages when used in fireproof glazing. These advantages include, in particular, the fact that the $TiO_2$ layers according to the invention can be applied by means of just a few processing steps and with different methods. Moreover, the arrangement of the layer inside the fireproof glass unit can be selected as a function of the requirements. It is also advantageous that UV stability can be attained irrespective of the type of fireproof layer. Consequently, the layer structure according to the invention can be employed for different fireproof layers.

BRIEF DESCRIPTION OF THE DRAWINGS

Additional advantages, special features and practical refinements of the invention disclosed fireproof glazing unit can be gleaned from the following description of preferred embodiments making reference to the figures.

The drawing figures show the following.

DETAILED DESCRIPTION

Figure 1:
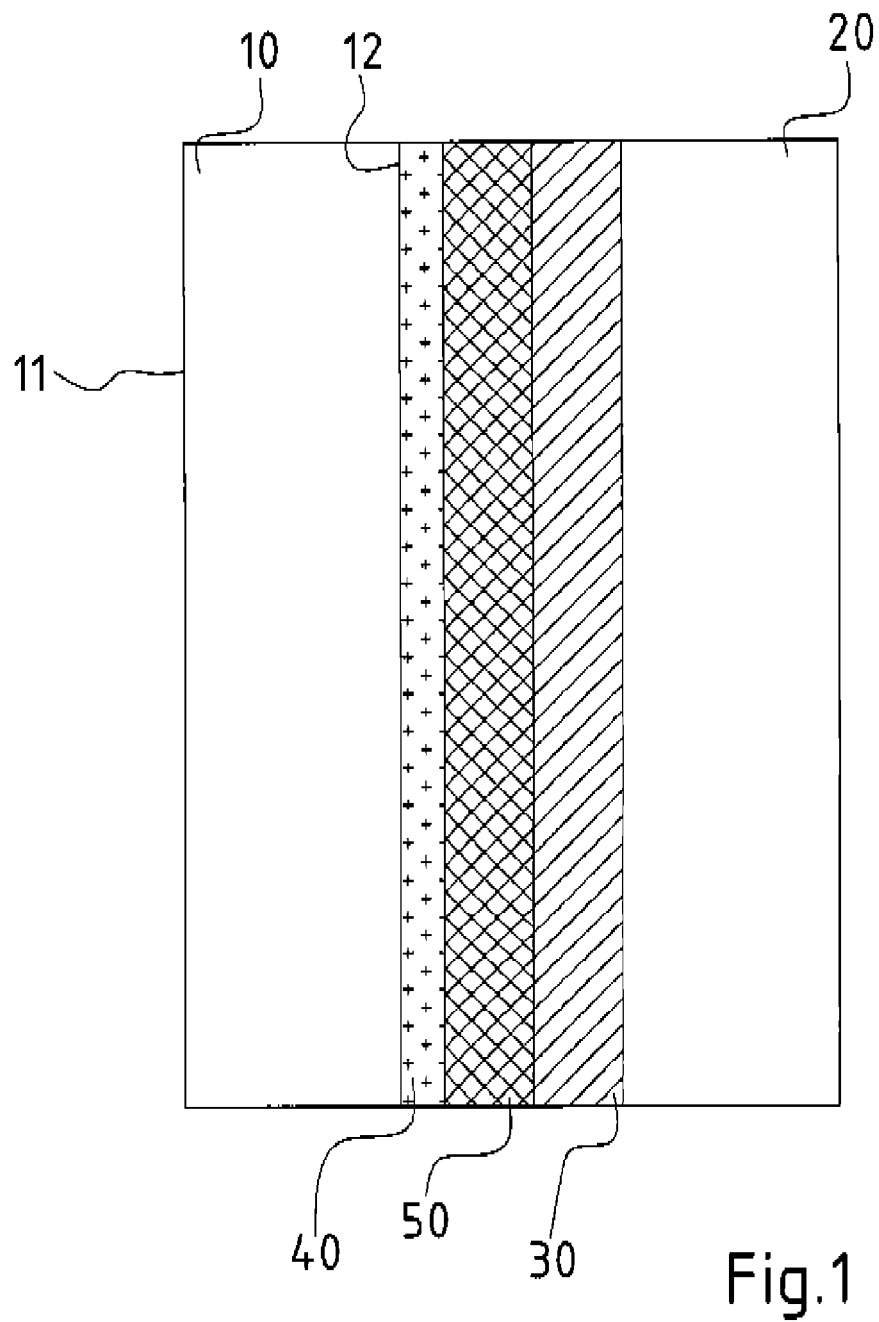
FIG. 1—a particularly preferred embodiment of a fireproof glass unit having a $TiO_2$ layer between an outer glass pane and a fireproof layer.

The depiction in FIG. 1 shows an especially preferred embodiment of the structure of a fireproof glazing unit having a $TiO_2$ layer. The fireproof glazing unit includes at least two transparent glass substrates (10; 20) that are positioned at a certain distance from each other, and of at least one likewise transparent fireproof layer (30) that is located between the glass substrates. The glass panes employed can be conventional panes used in the manufacture of transparent fireproof glazing.

The fireproof layer (30) can be formed in different ways. For instance, known hydrogels can be used whose main component is water with admixtures of salts and stabilizing polymers. Here, the stabilizing polymers serve as gel-forming agents. One can also use fireproof mixtures that contain water bonded to water glass, at least one cellulose derivative and, advantageously, preservatives. The preservative can be, for example, selected from among the group consisting of copper sulfate, copper acetate, benzoic acid and mixtures thereof.

Sol-gel techniques, gel casting-resin methods and/or pouring methods can all be employed in order to produce the fireproof layer. Pouring methods make use, for instance, of aqueous alkali-silicate solutions, preferably with admixtures, which are then poured onto a horizontal glass pane. The water of the solution is removed by means of drying procedures, so that the layer hardens to form a solid fireproof layer.

Such fireproof layers typically display absorption levels ranging from 4% to 15% of the UV-A radiation found in sunlight. Starting at an absorption level of about 4%, however, UV stability is no longer ensured. The structure of the fireproof glazing with a transparent $TiO_2$ layer (30) brings about a reduction of the incident UV radiation in the order of magnitude of 80%, so that the UV radiation absorbed by the fireproof layer arranged behind the $TiO_2$ layer does not exceed a value of about 4% of the total incident UV radiation.

In the embodiment depicted in FIG. 1, the $TiO_2$ layer is located between the outer glass pane (10) and the fireproof layer (30). Additional functional layers (50) can be arranged between these two layers. For instance, fluorine-doped $SnO_2$ layers can be used in order to attain additional R reflection. In the case of several functional layers, the $TiO_2$ layer can be suitably installed between different layers. When the layer structure is selected, it is definitely advantageously if the function of the layers is not detrimentally affected by the UV reduction.

In a particularly preferred embodiment, the thickness of the $TiO_2$ layer lies in the order of magnitude from 10 nm to 75 nm. It has been found that the relevant UV protection starts at a layer thickness of 10 nm, whereby the maximum layer thicknesses should not exceed 75 nm since otherwise, the transparency of the glass unit would be insufficient. Therefore, when it comes to optimizing the structure, it has been found to be advantageous to utilize especially layer thicknesses from 20 nm to 30 nm.

The $TiO_2$ layers can be applied by means of various methods. For example, $TiO_2$ can be applied by the magnetron sputtering method, which is preferably carried out reactively with a ceramic target. Moreover, sol-gel methods and CVD methods are good options in this context.

Figure 2:
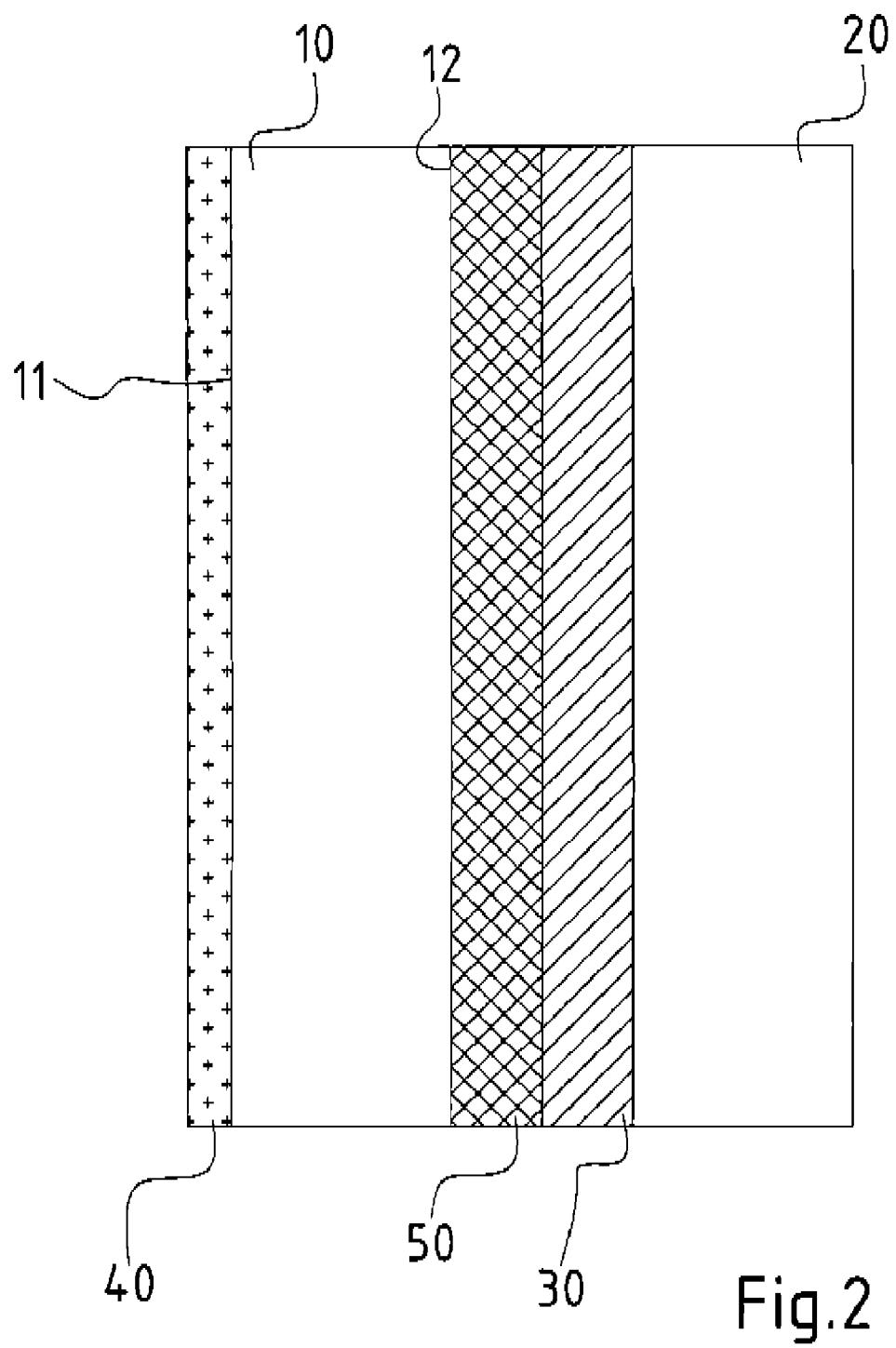
FIG. 2—an embodiment of a fireproof glass unit having a $TiO_2$ layer on the outer surface of a glass pane.

FIG. 2 shows another especially preferred embodiment in which the transparent $TiO_2$ layer is located on the outer surface of the outwardly-facing glass pane.

LIST OF REFERENCE NUMERALS 10 outer glass pane
11 outer surface of the outer glass pane
12 inner surface of the outer glass pane
20 inner glass pane
30 fireproof layer
40 $TiO_2$ layer
50 additional functional layer

The invention claimed is:

1. A fireproof glazing unit comprising at least two transparent glass substrates spaced from each other, at least one transparent fireproof layer disposed between the glass panes, and a transparent $TiO_2$ layer having a thickness in a range of 10 nm to 75 nm that reduces incidence of UV radiation onto the fireproof layer on at least one side of said fireproof layer, wherein the $TiO_2$ layer is disposed between an inner surface of an outwardly-facing glass pane and the fireproof layer.

2. The fireproof glazing unit according to claim 1, wherein the fireproof glazing unit comprises at least one functional layer in addition to the fireproof layer and the transparent $TiO_2$ layer.

3. The fireproof glazing unit according to claim 1, wherein the thickness of the $TiO_2$ layer is about 20 nm to 30 nm.

4. The fireproof glazing unit according to claim 1, wherein the $TiO_2$ layer is applied by a method selected from the group consisting of magnetron sputtering, sol-gel methods, and CVD methods.

5. The fireproof glazing unit according to claim 1, wherein the fireproof layer displays an absorption of at least 70% within the wavelength spectrum from 800 nm to 1400 nm.

6. The fireproof glazing unit according to claim 1, wherein the $TiO_2$ layer displays an absorption between 3% and 15% within the wavelength spectrum from 320 nm to 480 nm.

7. The fireproof glazing unit according to claim 1, wherein the $TiO_2$ layer displays a reflection of at least 40% within the wavelength spectrum from 320 nm to 480 nm.

8. The fireproof glazing unit according to claim 7, wherein the $TiO2$ layer displays a reflection of 40% to 60% within the wavelength spectrum from 320 nm to 480 nm.

9. A fireproof glazing unit comprising at least two transparent glass substrates spaced from each other, at least one transparent fireproof layer disposed between the glass panes, and a transparent $TiO_2$ layer having a thickness in a range of 10 nm to 75 nm that reduces incidence of UV radiation onto the fireproof layer on at least one side of said fireproof layer wherein the $TiO_2$ layer displays an absorption between 3% and 15% and a reflection of at least 40% within the wavelength spectrum from 320 nm to 480 nm.

10. The fireproof glazing unit according to claim 9, wherein the $TiO_2$ layer is disposed between an inner surface of an outwardly-facing glass pane and the fireproof layer.

* * * * *

UNITED STATES PATENT AND TRADEMARK OFFICE
CERTIFICATE OF CORRECTION

PATENT NO. : 7,340,869 B2  Page 1 of 1
APPLICATION NO. : 10/527385
DATED : March 11, 2008
INVENTOR(S) : Valentino Villari et al.

It is certified that error appears in the above-identified patent and that said Letters Patent is hereby corrected as shown below:

On the Cover Page:

At item (73), "Glagroep" should be -- Glasgroep --.

At item (30), "02020632" should be -- 02020632.2 --.

Signed and Sealed this

Twenty-ninth Day of July, 2008

JON W. DUDAS
*Director of the United States Patent and Trademark Office*